(12) United States Patent
Nelson et al.

(10) Patent No.: US 11,126,208 B2
(45) Date of Patent: Sep. 21, 2021

(54) MULTI-FUNCTION PRESSURE REGULATION VALVE

(71) Applicant: Nelson Irrigation Corporation, Walla Walla, WA (US)

(72) Inventors: Craig Nelson, Walla Walla, WA (US); Riley D. Greenwood, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 143 days.

(21) Appl. No.: 16/386,899

(22) Filed: Apr. 17, 2019

(65) Prior Publication Data
US 2019/0317534 A1 Oct. 17, 2019

Related U.S. Application Data

(60) Provisional application No. 62/658,968, filed on Apr. 17, 2018.

(51) Int. Cl.
| | | |
|---|---|---|
| *G05D 16/10* | (2006.01) | |
| *G05D 16/18* | (2006.01) | |
| *F16K 17/04* | (2006.01) | |

(52) U.S. Cl.
CPC .......... *G05D 16/103* (2013.01); *G05D 16/10* (2013.01); *G05D 16/187* (2019.01);
(Continued)

(58) Field of Classification Search
CPC ......... Y10T 137/7762; Y10T 137/7797; Y10T 137/7808; Y10T 737/88038
(Continued)

(56) References Cited

U.S. PATENT DOCUMENTS

| | | | | |
|---|---|---|---|---|
| 383,314 A | * | 5/1888 | McLaughlin | ........ G05D 16/103 |
| | | | | 137/505.25 |
| 2,761,389 A | * | 9/1956 | Turner | ............... G05D 16/0655 |
| | | | | 417/83 |

(Continued)

FOREIGN PATENT DOCUMENTS

| | | |
|---|---|---|
| WO | 2016/189466 | 12/2016 |
| WO | 2018/163161 | 9/2018 |

OTHER PUBLICATIONS

B.A. King et al., "A Variable Flow Rate Sprinkler for Site-Specific Irrigation Management", vol. 20(6):, 765-770, 2004 American Society of Agricultural Engineers ISSN 0883-8542.
(Continued)

*Primary Examiner* — Robert K Arundale
*Assistant Examiner* — Richard K. Durden
(74) *Attorney, Agent, or Firm* — Nixon & Vanderhye P.C.

(57) ABSTRACT

A pressure regulator (10) including: a housing (12, 14) including a flow passage (44, 46, 48); a plunger (38) configured to move within the housing, wherein the plunger is hollow and has a plunger passage (46) included in the flow passage; a valve seat (52) in the housing and disposed in the flow passage immediately upstream of an inlet (44) to the plunger passage; a shuttle (42) within the housing configured to move between an upstream-most position at which the shuttle abuts the valve seat to close the flow passage and a downstream position displaced from the valve seat which opens the flow passage; a sealed chamber (26) within the housing and between the plunger and the shuttle, wherein the sealed chamber is configured to be operated at pressures other than at atmospheric pressure; and a port (66) in the housing and open to the sealed chamber, wherein the port is configured to be connected to a source (68) of a pressurized fluid.

21 Claims, 6 Drawing Sheets

(52) U.S. Cl.
CPC ....... *F16K 17/048* (2013.01); *Y10T 137/7762* (2015.04); *Y10T 137/7797* (2015.04); *Y10T 137/7808* (2015.04); *Y10T 137/88038* (2015.04)

(58) Field of Classification Search
USPC .......................................................... 251/63
See application file for complete search history.

(56) References Cited

U.S. PATENT DOCUMENTS

| | | | |
|---|---|---|---|
| 3,874,404 A * | 4/1975 | Waight | F16K 17/20 |
| | | | 137/493 |
| 3,890,999 A * | 6/1975 | Moskow | G05D 16/103 |
| | | | 137/505.25 |
| 5,009,368 A | 4/1991 | Streck et al. | |
| 5,246,164 A | 9/1993 | McCann et al. | |
| 5,257,646 A | 11/1993 | Meyer | |
| 5,427,151 A * | 6/1995 | Pauley | B01F 5/0077 |
| | | | 137/505.25 |
| 5,732,735 A * | 3/1998 | Birch | F17C 5/06 |
| | | | 137/505.11 |
| 5,875,815 A | 3/1999 | Ungerecht et al. | |
| 6,374,853 B1 | 4/2002 | Callies | |
| 6,755,362 B2 | 6/2004 | Krieger et al. | |
| 6,758,238 B2 | 7/2004 | Callies | |
| 6,938,842 B2 | 9/2005 | Choat et al. | |
| 7,048,001 B2 | 5/2006 | Youngberg et al. | |
| 7,401,622 B2 | 7/2008 | Ungerecht | |
| 7,805,221 B2 | 9/2010 | Nickerson | |
| 8,567,433 B2 | 10/2013 | Ungerecht et al. | |
| 8,678,029 B2 | 3/2014 | Ungerecht et al. | |
| 9,128,489 B2 | 9/2015 | Bauman et al. | |
| 9,367,070 B2 | 6/2016 | Greenwood et al. | |
| 9,459,631 B2 | 10/2016 | Lawyer et al. | |
| 10,906,052 B2 * | 2/2021 | Greenwood | G05D 16/02 |
| 2004/0007269 A1 * | 1/2004 | Larsen | G05D 16/106 |
| | | | 137/505.25 |
| 2010/0032493 A1 | 2/2010 | Abts et al. | |
| 2012/0285557 A1 * | 11/2012 | Ungerecht | G05D 16/2095 |
| | | | 137/528 |

OTHER PUBLICATIONS

International Search Report and Written Opinion cited in PCT/US19/27814 dated Jul. 5, 2019, 15 pages.

* cited by examiner

MULTI-FUNCTION PRESSURE REGULATION VALVE

RELATED APPLICATION

This application claims priority to provisional U.S. Patent Application 62/658,968, filed Apr. 17, 2018, the entirety of which is incorporated by reference.

FIELD

The invention relates to pressure regulators for liquid flow passages, and particularly to pressure regulators for supplying water to irrigation sprinklers and nozzles.

BACKGROUND

Irrigation systems often have many sprinklers and nozzles arranged along an extended water supply pipe. For example, a water supply pipe in a center pivot irrigation system may extend a quarter to half a mile (400 to 800 meters). The water supply pipe may have a diameter of six to ten inches (152 to 254 millimeters) and provide water for over a hundred sprinklers or nozzles arranged along the pipe. Similarly, solid set irrigation systems may include long rows of plastic water supply pipes placed between rows of crops with sprinklers on posts at regular locations along the supply pipes. Each sprinkler or nozzle is typically connected to the water supply pipe by a smaller water pipe that extends vertically and includes a pressure regulator.

The sprinklers and nozzles are typically designed to receive water under a relatively low pressure and within a narrow pressure range. There is a pressure regulator associated with each sprinkler or nozzle. Pressure regulators are in a water flow path between the water supply pipe and the sprinkler or nozzle. The pressure regulator maintains a uniform water pressure flowing to the sprinkler or nozzle. The pressure regulator ensures that the water pressure is within the design range of the sprinkler or nozzle.

Pressure regulators typically function solely to regulate the water pressure applied to a sprinkler or nozzle. They respond to the pressure at their inlet. If the pressure is too low, the pressure regulator may shut off flow through the regulator. As the water pressure at the inlet increases, the pressure regulator allows water to flow and ensures that the water pressure at its outlet remains generally constant.

Variable flow irrigation systems have been developed that provide variable water flow to nozzles and sprinklers. Variable flow irrigation systems provide precise control of the water applied by sprinklers and nozzles. Variable flow irrigation systems may be used to provide precise amounts of water, especially small amounts of water, for crops that are sensitive to too much or too little water. Variable flow control systems may also be used to adjust the amount of water flowing to certain regions of a field that tend to become too wet, such as a depression in the field.

Variable flow irrigation may be achieved by turning sprinklers or nozzles on and off in a repeating pattern such as on for 30 seconds and off for 30 seconds; on for 10 seconds and off for 20 seconds; and other patterns of on-off operation. Variable flow irrigation systems typically require a complex network of water flow valves to turn on and off the flow of water to each of the sprinklers and nozzles in the irrigation system. The costs and effort are large to add remotely controllable valves for each sprinkler and nozzle in an irrigation system.

Thus, there is a need for a less expensive and less complex system to provide variable flow irrigation, and particularly to turn on and off sprinklers or nozzles in accordance with prescribed patterns or cycles.

SUMMARY

The inventors conceived of and disclose here a pressure regulator which may be controlled, such as remotely, to turn on and off water flow in accordance with prescribed patterns or cycles through the regulator to the sprinkler or nozzle attached to the pressure regulator. A variable flow irrigation system is provided that uses a controllable pressure regulator and does not require an additional water flow control valve for each sprinkler or nozzle.

The pressure regulator includes a pressurizable chamber. Pressurizing the chamber causes a shuttle to move within the pressure regulator and shut off water flow into the plunger flow passage. Releasing the pressure in the chamber allows the shuttle to move and open the regulator to water flow. The pressure in the chamber may be controlled, such as remotely or according to a pre-programmed sequence of openings and closings. Thus, the pressure regulator may be controlled to turn on or off the water flow through the pressure regulator.

The chamber used to switch on and off the pressure regulator may be a sealed chamber which houses a spring, such as a helical spring, another type of mechanical spring or other deformable and resilient device. The chamber includes seals to allow for pressurization of the chamber. A pressurization port is added to the housing of the chamber. A supply of pressurized air or other pressurized fluid is coupled to the port. A controller determines when to pressurize the chamber. When the chamber is pressurized, a shuttle moves to close a water flow passage in the pressure regulator. When pressure is released from the chamber, the shuttle is displaced by water pressure at the inlet to the pressure regulator. The displacement of the shuttle opens the pressure regulator and allows water flow.

The pressure regulator continues to perform its usual function of regulating water pressure at the outlet from which water flows to the sprinkler or nozzle connected to the pressure regulator. The pressurization of the chamber does not interfere with the operation of the components in the pressure regulator, such as the plunger, mechanical spring and diaphragm all of which regulate the outlet water pressure.

An embodiment of the invention is a pressure regulator including: a housing including a flow passage; a plunger configured to move within the housing, wherein the plunger is hollow, and has a passage included in the flow passage; a valve seat in the housing and disposed in the flow passage immediately upstream of an inlet to the passage in the plunger; a shuttle within the housing configured to move between an upstream-most position at which the shuttle abuts the valve seat to close the flow passage and a downstream position displaced from the valve seat which opens the flow passage; a sealed chamber within the housing and between the plunger and the shuttle, wherein the sealed chamber is configured to be operated at pressures other than atmospheric pressure while the pressure regulator is operating as an on-off valve, and a port in the housing and open to the sealed chamber, wherein the port is configured to be connected to a source of a pressurized fluid.

In another embodiment, the invention is a liquid flow control device, which need not be a pressure regulator, and the liquid flow control device includes: a housing including a flow passage extending from an inlet, through the housing to an outlet; a plunger configured to move reciprocally within the housing along an axis of the plunger, wherein the plunger is hollow and defines a passage included in the flow passage of the housing; a valve seat in the housing and disposed in the flow passage immediately upstream of an inlet to the passage of the plunger; a shuttle within the housing and configured to move reciprocally with respect to both the housing and the plunger, wherein the shuttle has an upstream-most position within the housing at which the valve shuttle abuts the valve seat and closes the flow passage and a downstream position displaced from the valve seat and which opens the flow passage, a sealed chamber within the housing and between the plunger and the shuttle, wherein the sealed chamber is configured to be operated at pressures other than atmospheric pressure, and a port in the housing and open to the sealed chamber, wherein the port is configured to be connected to a source of a pressurized fluid.

In another embodiment, the invention is a method to control a pressure regulator, wherein the regulator includes a housing having a flow passage, a plunger defining a portion of the flow passage, and a sealed chamber between the plunger and a shuttle, wherein the method comprises:

(A) regulating water pressure in a water outlet portion of the flow passage by adjusting a gap between an inlet of the plunger and a valve seat fixed to the housing, wherein the gap is adjusted by movement of the plunger due to the water pressure in the water outlet portion acting on the plunger;

(B) moving the shuttle to seal against the valve seat and thereby close the flow passage, wherein the movement of the shuttle is driven by injecting a pressurized fluid into the sealed chamber; and (C) moving the shuttle away from the valve seat to thereby open the flow passage, wherein the movement of the shuttle is driven by releasing the pressurized gas from the sealed chamber to reduce pressure in the chamber.

In another embodiment, the invention is a method to control a liquid control device including a housing having a flow passage extending through the housing from an inlet to an outlet, wherein the flow passage is partially defined by a hollow conduit within the housing, a shuttle, and a sealed chamber between the hollow conduit and the housing, wherein the method comprises:

(A) moving the shuttle within the housing to close a gap (G) between a valve seat in the housing an inlet to the hollow seal conduit, wherein the movement of the shuttle is driven by injecting a pressurized fluid into the sealed chamber and wherein closing the gap closes the flow passage; and (B) moving the shuttle away from the valve seat to thereby open the gap and allow liquid to flow into the inlet of the hollow conduit and from the outlet of the housing, wherein the movement of the shuttle is driven by releasing the pressurized fluid from the sealed chamber to reduce pressure in the sealed chamber.

BRIEF DESCRIPTION OF THE DRAWINGS

Other aspects, features, and advantages of the disclosed and novel drain check valve for a pressure regulator are apparent from the following detailed description when taken in conjunction with the accompanying drawings, which are a part of this disclosure and which illustrate, by way of example, principles of this technology.

DETAILED DESCRIPTION OF AN EMBODIMENT OF THE INVENTION

FIGS. 1 to 5 show a flow-through type pressure regulator 10 in perspective, cross-sectional and exploded views, respectively. The pressure regulator 10 includes a housing formed by an inlet cap 12 and an outlet cap 14. The inlet and outlet caps are connected by a snap connection, but may be connected by a threaded connection, friction fit connection or other connection. The connection may or may not allow the inlet and outlet caps to be separated after assembly of the pressure regulator.

Figure 1:
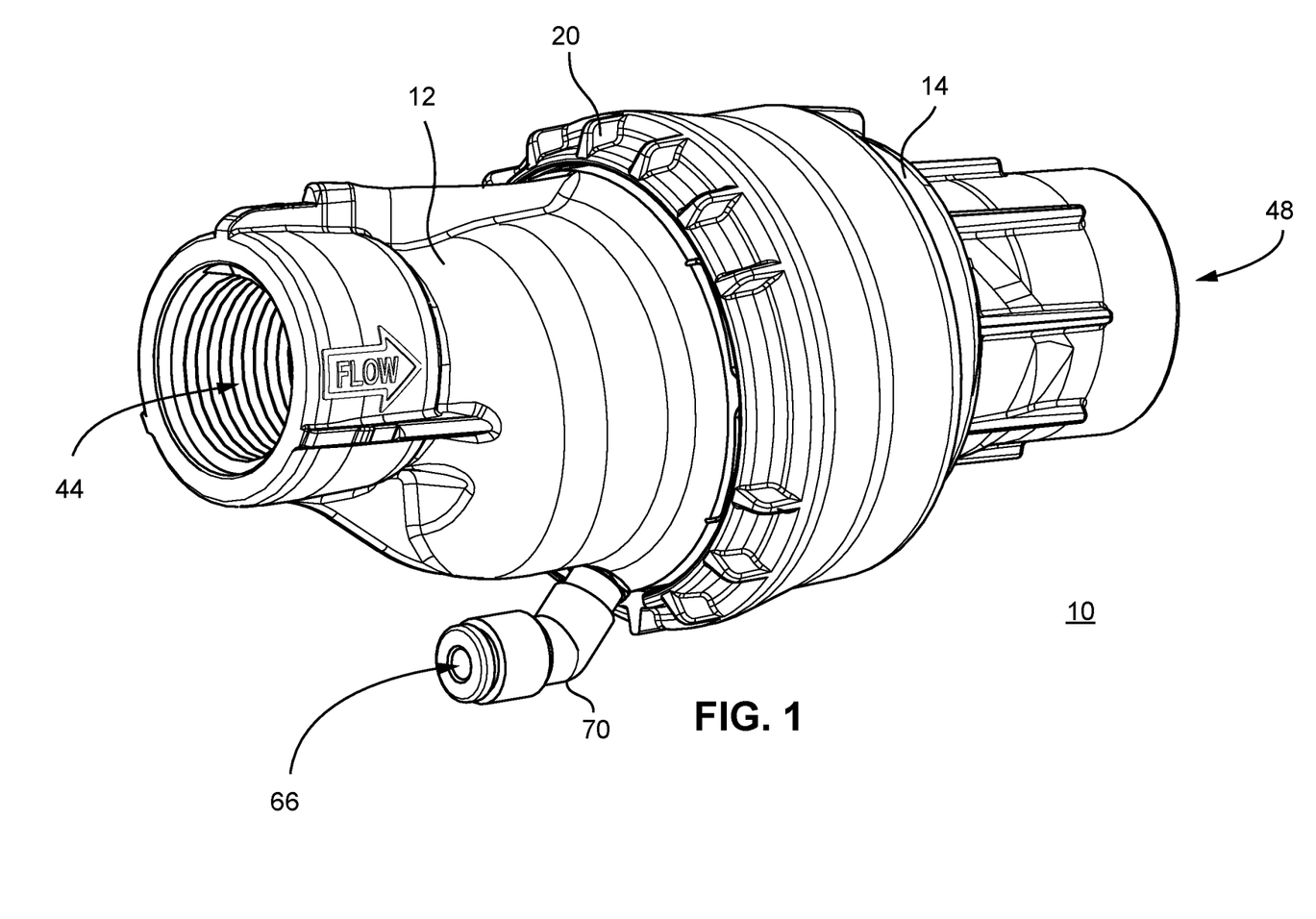
FIG. 1 is an inlet side perspective view of a pressure regulator with an internal chamber which may be pressurized to control the regulator.

The inlet cap 12 has an end portion with an annular connector 16 that may be formed by an annular row of teeth. Similarly, an end of the outlet cap 14 has an annular connector 18 at an end portion therefore. Each connector 16, 18 may have an annular row of teeth. The teeth of one connector slide between the teeth of the other connector when the inlet cap and outlet caps are pushed together.

Figure 2:
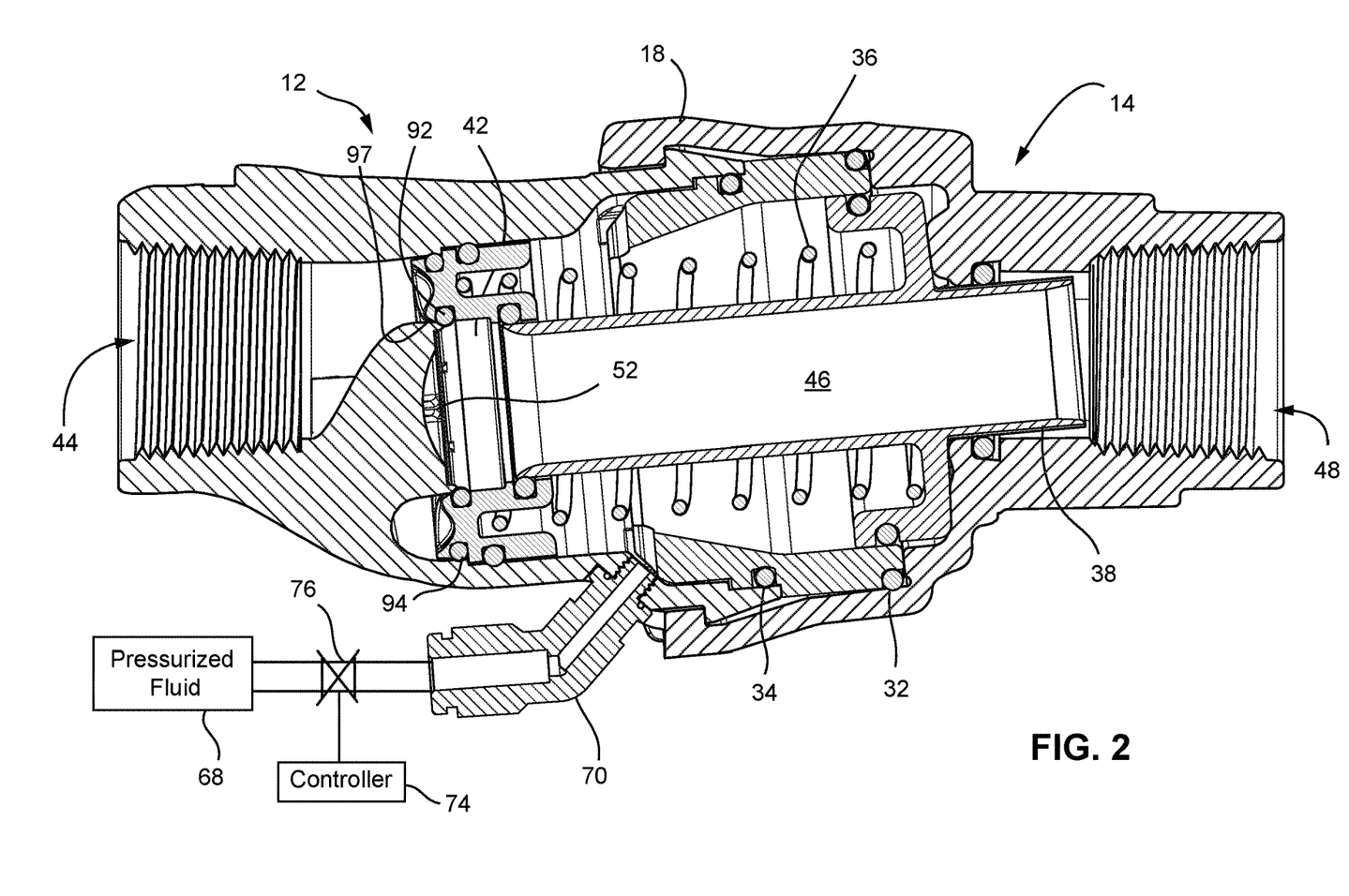
FIG. 2 is a cross-sectional view of the pressure regulator of FIG. 1, wherein the shuttle surrounds the valve seat to shut-off water flow through the pressure regulator.
Figure 3:
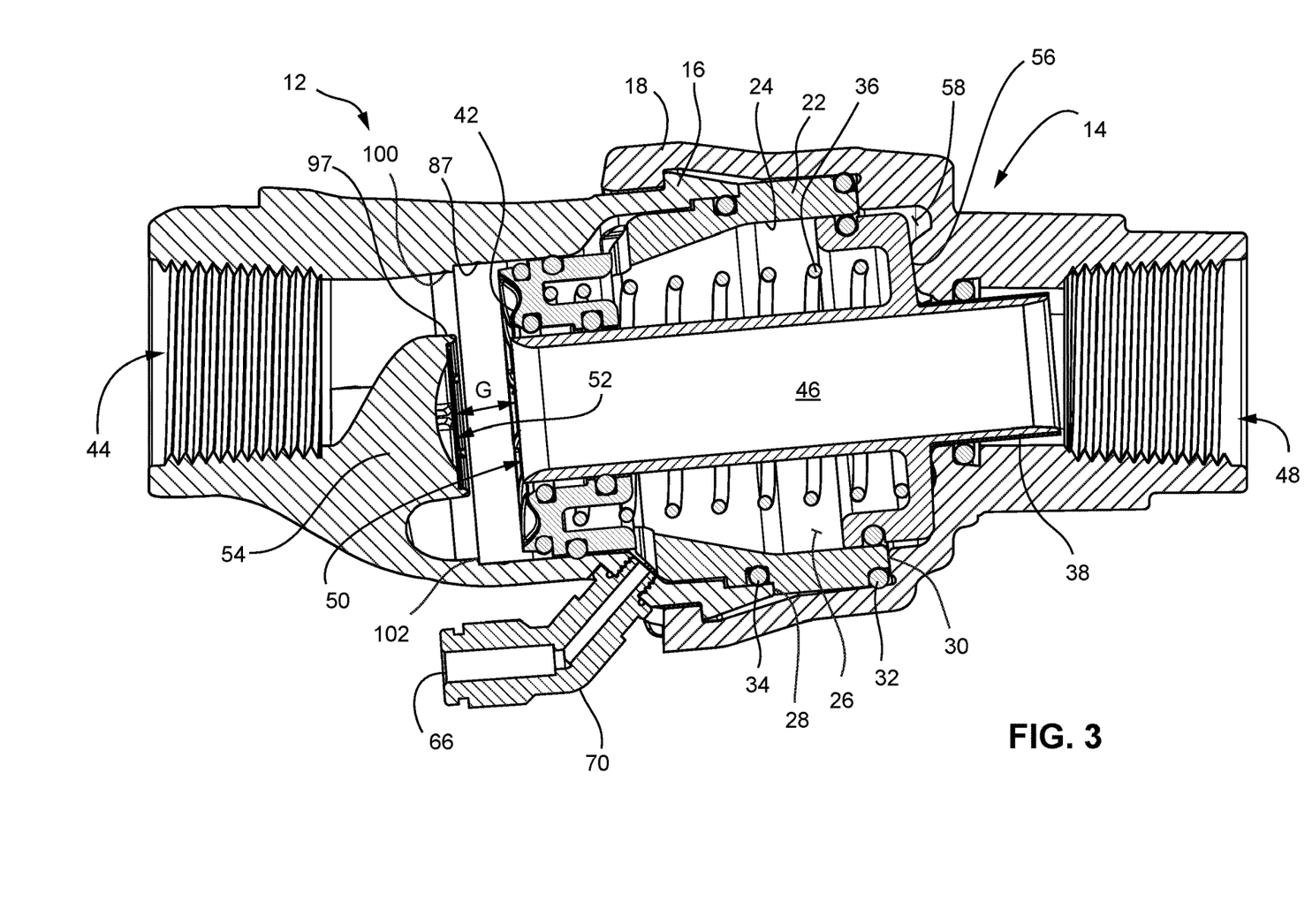
FIG. 3 is a cross-sectional view of the pressure regulator of FIG. 1.
Figure 4:
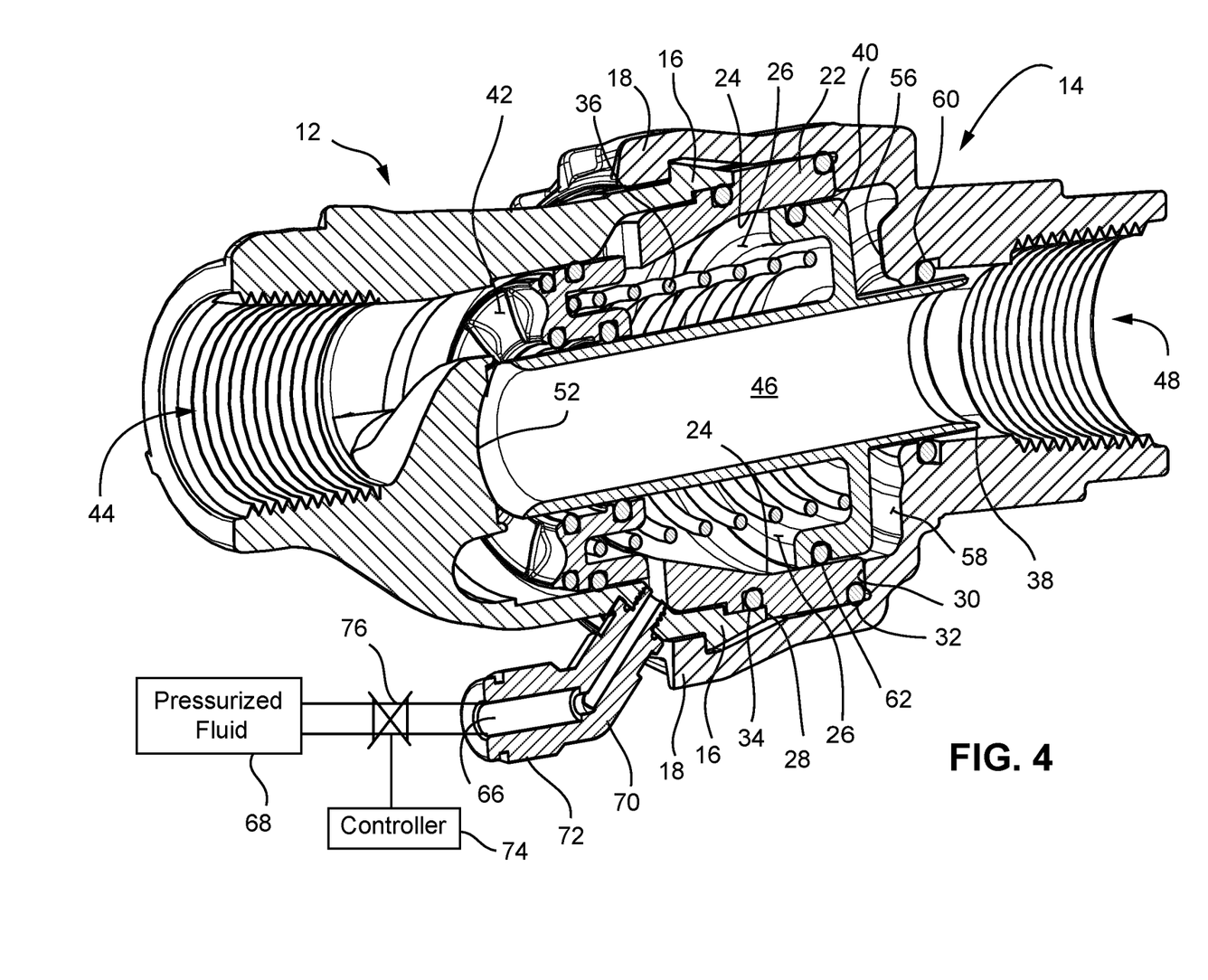
FIG. 4 is an inlet side perspective view of the pressure regulator of FIG. 1 shown in cross section.

As shown in FIGS. 2 to 4, a hollow, annular liner 22 is housed by and is between the inlet and outlet caps. An inner surface 24 of the liner 22 forms a radially inward surface of a sealed chamber 26 within the pressure regulator. An outer surface of the liner 22 has an annular ledge 28 that abuts an annular edge of the connector 16 of the inlet cap 12. An annular end 30 of the liner abuts an annular ledge on the outlet cap 14. The liner 22 is secured in the pressure regulator by the inlet and outlet caps 12 and 14.

O-ring seals 32, 34 are in grooves or recesses in the outer surface of the liner 22. The O-ring seals prevent air or other fluid leaking from the sealed chamber 26, through gaps between the outer surface of the liner and the inner surfaces of inlet and outlet caps, and out to the atmosphere. The O-ring seal 32 is seated in a recess at the end 30 of the liner. The O-ring 32 is between the outer surface of the liner and the inner surface of the outlet cap 14. The O-ring 34 is in a groove in the outer surface of the liner and is between the liner and an inner surface of the inlet cap 12.

The sealed chamber 26 is in a region within the pressure regulator that has conventionally been used to house a coil spring 36. The sealed chamber 26 is bordered by the inner surface of the liner 22, the outer surface of a cylindrical plunger 38, an upstream surface of an annular flange 40 fixed to the plunger, and a downstream surface of an annular shuttle 42.

The coil spring 36 biases the flange 40 and its plunger 38 towards the outlet cap 14. The coil spring also biases the shuttle 42 towards the inlet cap. The plunger 38, with its flange 40, moves axially with respect to the chamber 26. Similarly, the shuttle 42 moves axially with respect to the chamber.

The movements of the shuttle 42 and the plunger 38, open or close the valve and regulate water flow through the pressure regulator 10, respectively. Water enters an inlet flow passage 44 in the inlet cap 12, passes through a plunger flow passage 46 in the plunger and out an outlet flow passage 48 in the outlet cap 14.

The flow through the pressure regulator 10 depends, in part, on the narrowest gap in the flow passages 44, 46 and 48 in the regulator. The narrowest gap (G) is formed between the inlet 50 of the plunger 38 and a valve seat 52, which is at the downstream end of a strut 54 extending from the inlet cap. The valve seat 52 may have a disc shape with an annular surface configured to abut against an entirety of a circular edge of the inlet 50 to the plunger.

The area of gap (G) varies depending on the position of the inlet 50 of the plunger 38. The gap is greatest while the plunger is displaced against an annular ledge 56 in the outlet cap. The gap (G) is narrowest, and can be substantially closed, if the circular edge of the inlet 50 to the plunger is against the valve seat 52. Movement of the plunger 38 changes the area of the gap (G) and thus water flow through the regulator.

Movement of the plunger 38 is driven by water pressure at the outlet flow passage 48. Water flowing through the outlet flow passage 48 seeps into a chamber 58 between the annular ledge 56 of the outlet cap and the flange 40 of the plunger. The water pressure in the chamber 58 is substantially the same as the water pressure in the outlet flow passage 48. As the water pressure in the outlet passage 48 increases, the water pressure also increases in the chamber 58. This increase in water pressure in chamber 58 displaces the flange 40 and plunger 38 towards the valve seat 52. As the water pressure in the chamber 58 becomes greater than the force of the spring 36 applied to the flange 40, the plunger is moved towards the valve seat. This movement reduces the gap (G) and restricts water flow through the regulator. Restricting water flow through the gap reduces the water pressure in the plunger flow passage 46 and the outlet flow passage 48. As the pressure reduces in the outlet flow passage 48, the pressure in the chamber 58 likewise reduces and the plunger 38 slides from the valve seat. This interaction between the water pressure of the outlet flow passage 48, the movement of the plunger, and the width of the gap (G) which determines the water flow through the regulator provides a regulating function that maintains a generally uniform water pressure flowing from the outlet flow passage 48.

An O-ring 60 may be seated in a groove in the wall of the outlet flow passage 48. The O-ring is in the fluid passage between the outlet flow passage 48 and chamber 58. The O-ring 60 does not seal the fluid passage. Rather, the O-ring narrows the passage 48 and thereby slows the flow in and out of the chamber 58. By slowing the flow, the rate of pressure change in the chamber 58 is dampened to avoid too quick movements, e.g., vibration, of the plunger 38. The O-ring and its operation is described in detail in U.S. Pat. No. 5,257,646, which is incorporated by reference.

An O-ring seal 62 is in an annular outer wall 64 of the flange 40 of the plunger 38. The O-ring seal 62 prevents water or other fluid flow into or out of the sealed chamber 26 and into the chamber 58 between the flange 40 and the ledge 56 of the outlet cap. The O-ring seal 62 is retained in a groove in the outer wall 64 of the flange. The O-ring 62 slides against the inner wall 24 of the liner as the plunger moves back and forth along its axis with respect to the liner 22. Other means may be used for preventing flow out or into the chamber 26 and between the liner 22 and the outer wall 64 of the flange 40 of the plunger. For example, a diaphragm extending from the flange 40 and liner 22 may be used to seal the chamber 26 housing the spring from the chamber 58 between the plunger flange 40 and the ledge 56 in the outlet cap 14.

The sealed chamber 26 is pressurized via a pressure port 66 that provides a fluid connection between the chamber 26 and a source 68 of a pressurized fluid, such as a source of pressurized air. The port may be a conduit extending through a stem 70 attached to a sidewall of the inlet cap 12. The stem 70 includes a connector 72 that may connect to a hose linking the pressurized fluid source 68 to the port 66. The outlet of the port is open to the sealed chamber 26.

The shuttle 42 may be configured to operate as an on-off valve for water flow through the pressure regulator 10. To shut off water flow, the shuttle 42 moves upstream to the valve seat 52. The shuttle has an inner wall that slides over an outer rim of the valve seat 52 and its strut 54.

The sealed chamber 26 may be pressurized from the source of a pressurized fluid 68 to move the shuttle 42 to the off position such that the shuttle covers the valve seat 52 and thereby closes the water flow passage into the inlet 50 to the plunger flow passage 46. To close the pressure regulator, the pressure in the sealed chamber must be sufficient to overcome the water pressure in the inlet flow passage 44 that acts on the front face of the shuttle 42. The force of the spring 36 assists the force applied by the pressure in the sealed chamber 26 to move the shuttle to the closed position.

To open the water flow passage, pressure in the sealed chamber 26 is released by venting through the port 66 to the atmosphere or a vacuum. Releasing the pressure allows the sealed chamber 26 to be near or below atmospheric pressure, when the sealed chamber 58 is not pressurized, the water pressure in the inlet flow passage 44 overcomes the force of the spring 36 and moves the shuttle in a downstream direction and thereby opens the flow passage.

By controlling the pressure in the sealed chamber 26, the shuttle 42 may be moved to turn on and off water flow through the pressure regulator 10. The pressure in the sealed chamber 26 may be controlled by a controller 74 that actuates a valve 76 connected to the port 66 for the sealed chamber. The valve may have an open position that allows pressurized fluid from the source of the pressurized fluid 68 to flow into the sealed chamber 26, and a vent position that allows pressure from the sealed chamber 26 to vent to the atmosphere. The valve may also have a closed position that prevents gas flowing out of the port 66.

The controller 74 may be a computer control system or processor that communicates via a wired or wireless link with a respective valve 76 for each of the pressure regulators in an irrigation system. Similarly, a valve 76 may control the fluid pressure applied to a group of pressure regulators. The valve 76 for each pressure regulator or group of regulators may include an actuator which is controlled by the controller and turns the valve to its different positions.

The controller 74 may be configured to control each pressure regulator 10 to turn on and off water flow in accordance with a schedule set by an operator or set in accordance with the agriculture crop to be irrigated or the field to be irrigated. For example, the schedule may be that for every 30-second interval the pressure regulator allows water flow for a certain period, such as 20 seconds, and turns off the water flow for 10 seconds. This schedule of turning on and off water flow may be used for all the pressure regulators in an irrigation system. The schedule is achieved by having the controller 74 command the valves 76 for all the pressure regulators to pressurize and vent the sealed chambers in the pressure regulators based on the schedule.

The shuttle may function as an automatic shut-off for the pressure regulator. This automatic shut-off function is independent of the controller and is operable while the sealed chamber 26 is near or below atmospheric pressure. The shut-off function may be to shut off water flow through the pressure regulator automatically when the water pressure at the inlet passage 44 falls below a threshold pressure level.

The automatic shut-off operates based on the force the spring 36 applies to the shuttle 42. The shuttle 42 is biased by the spring 36 towards an upstream position that shuts off water flow through the pressure regulator. If the water pressure at the inlet flow passage 44 is not sufficient to overcome the spring force applied to the shuttle, then the spring 36 keeps the shuttle 42 biased in an upstream direction and thereby closes the gap between the plunger inlet 50 and the valve seat 52. The shuttle is moved from the shut-off position by water pressure in the inlet flow passage 44 that acts on the front face of the shuttle. As the water pressure increases in the inlet flow passage, the shuttle 42 is moved towards a downstream position that creates an opening between the shuttle, the valve seat 52 and the inlet 50 of the plunger 38. This opening allows water to flow through the pressure regulator 10. The water pressure at the inlet flow passage 44 needed to move the shuttle 42 and thereby open the pressure regulator to water flow may be a predetermined threshold pressure level. Thus, the shuttle may be configured to shut off water flow through the pressure regulator 10 while the water pressure at the inlet flow passage 44 is below the threshold pressure level.

Pressurizing the sealed chamber 26 with enough pressure from the source 68 of the pressurized fluid will overcome the water pressure in the inlet flow passage and move the shuttle 42 to an upstream position to stop water flow.

Figure 5:
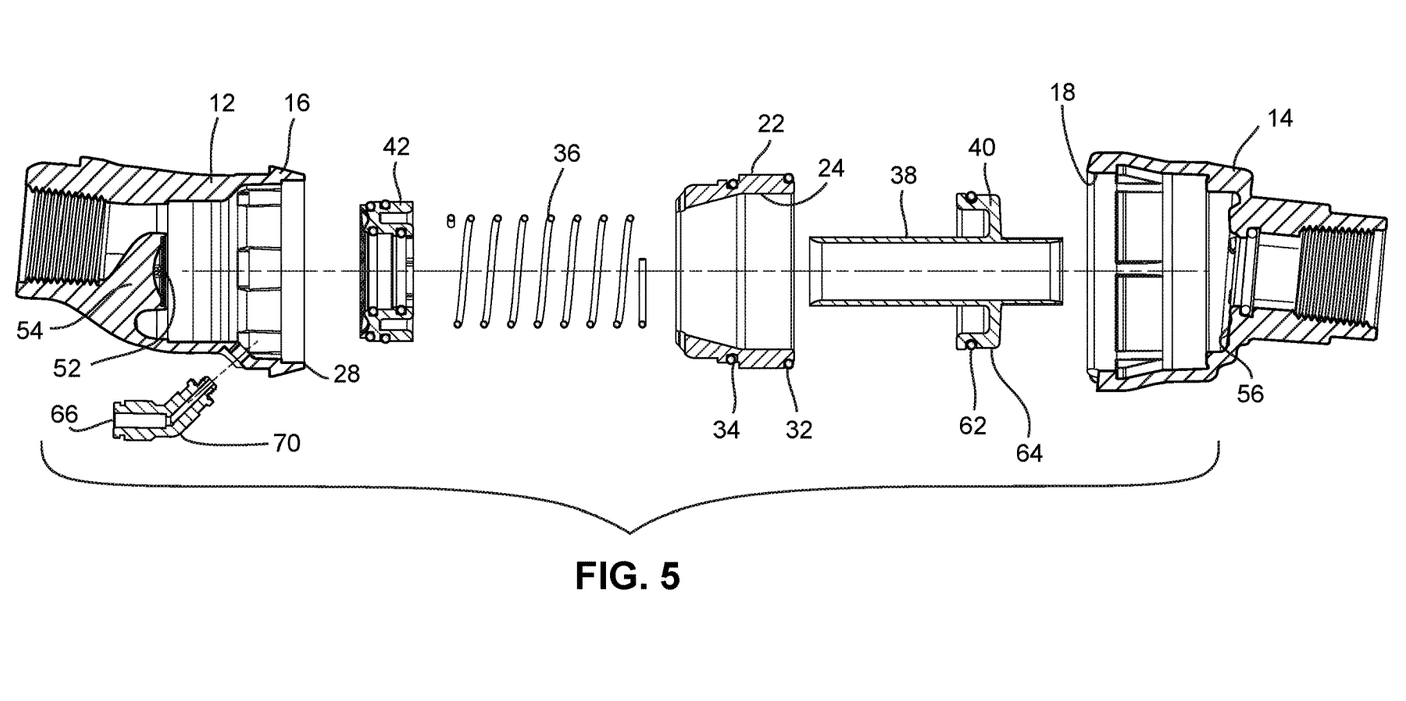
FIG. 5 is an exploded view of the pressure regulator of FIG. 1.
Figure 6:
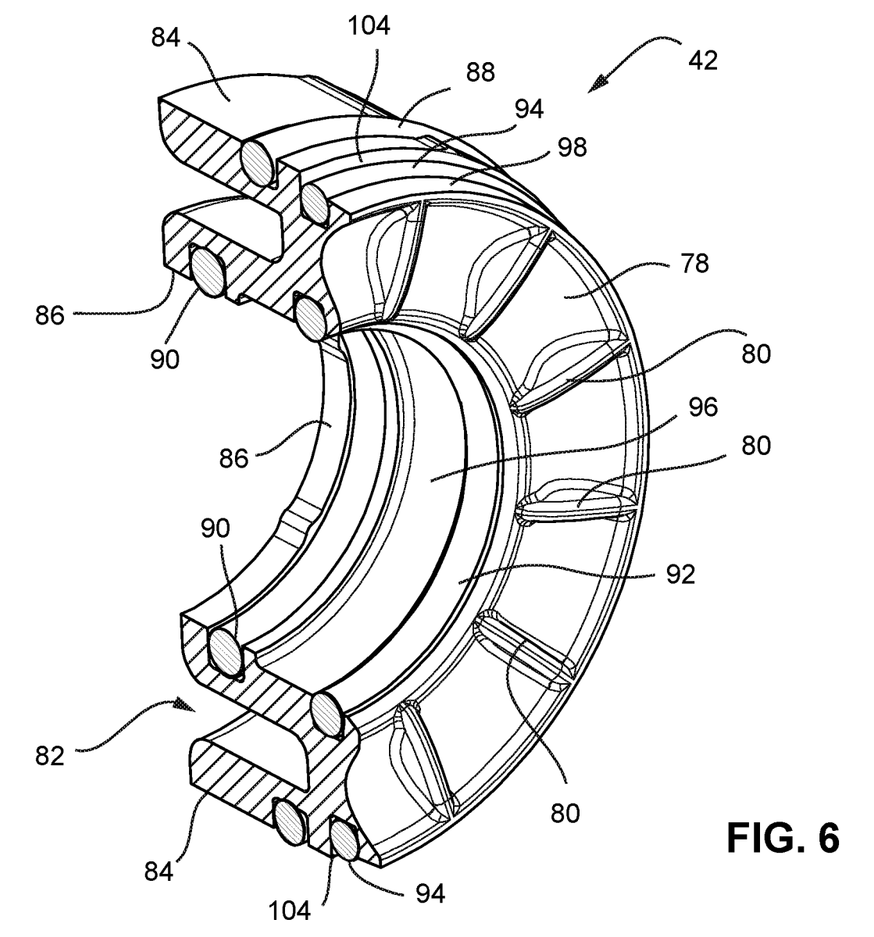
FIG. 6 is a cross-sectional view of the shuttle for the pressure regulator of FIG. 1.

FIG. 5 shows the shuttle 42 in partial cross section and in a perspective view. The shuttle 42 includes a front face 78 that faces upstream towards the water flow coming through the inlet flow passage 44. The front face 78 is annular and may have a concave shape in cross section. Ribs 80 may be arranged symmetrically around the front face 78. The concave shape of the front face and the ribs 80 assist in directing water from the front face radially inward towards a gap between the shuttle and the valve seat. An annular slot 82 in the rear of the shuttle 42 is configured to receive the coil spring 36.

The shuttle 42 has an outer cylindrical surface 84 and an inner cylindrical surface 86. Both surfaces 84, 86 have grooves to receive respective O-ring seals 88, 90. The O-ring seal 88 in the annular groove on outer cylindrical surface 84 forms a water tight seal between the shuttle and an inner cylindrical surface 87 of the inlet cap 12. The O-ring seal 90 in the annular groove on the inner cylindrical surface 86 forms a water tight seal between the shuttle 42 and an outer cylindrical surface (FIG. 3) of the plunger 38. These O-ring seals 88, 90 remain in their respective grooves of the shuttle and slide against the surfaces of the inlet cap or plunger.

The shuttle 42 also includes a second set of O-ring seals 92, 94 that assists in providing a water tight seal with the valve seat 52 while the shuttle is its upstream-most position in the inlet cap 12. The O-ring 92 is in a groove on an inner cylindrical surface 96 which has a larger diameter than does the inner radial surface 86 which seats the O-ring 90. O-ring 92 has a larger diameter and is radially outward of the other O-ring 90 on the inner surface 86 of the shuttle 42. Because of its larger diameter, the O-ring 92 does not abut or slide against the outer surface of the plunger 38. The O-ring 92 is sized to form a seal with an outer cylindrical surface 97 (FIG. 3) at the downstream end of the strut 54. The O-ring 92 engages the surface 97 of the strut 54 only while the shuttle 42 is in the upstream-most position. The O-ring 92 forms a water tight seal against the surface 97 of the strut, while the shuttle is in the upstream-most position. The O-ring 92 does not form a water tight seal while the shuttle 42 is moved downstream and the O-ring 92 is not engaged with the surface 97 of the strut.

The O-ring 94 is seated in a groove in an outer cylindrical surface 98 of the shuttle 42, which is radially inward of the outer cylindrical surface 84. The O-ring 94 has a smaller diameter and is radially inward of the O-ring 88. Thus, O-ring 94 does not abut and does not slide against the same cylindrical surface 87 against which slides O-ring 88. The O-ring 94 engages and seals against a cylindrical surface 100 (FIG. 3) on the inlet cap and in the inlet flow passage 44. The surface 100 has a narrower diameter than the cylindrical surface 87 which is also on the inlet cap and in the inlet flow passage 44. A small annular step 102 or ramp transitions the inlet flow passage between the surfaces 87 and 100. The O-ring 94 abuts and forms a water tight seal with the cylindrical surface 100 while the shuttle 42 is at the upstream-most position.

It may be desired for the shuttle to move quickly between the shut-off and open positions. Similarly, it may be desirable to avoid a position in which the shuttle is, for extended periods, in an intermediate position between the upstream-most and downstream-most positions. If left in an intermediate position, the shuttle may reduce water flow through the pressure regulator in an undesired manner.

The O-ring 94 and annular step 102 assists in transitioning the shuttle from a shut-off position (where the shuttle is in the most upstream position) to an open position (where the shuttle is moved to a downstream-most position). As the shuttle moves from the upstream-most position, the O-ring 94 slides away from the inner surface 100 on the inlet cap, water flows around the O-ring and acts on the annular step 102 in addition to the front face 78 of the shuttle 42. Because the surface area facing the water flow is increased by the step 102, the force applied by the water to the shuttle similarly increases as the O-ring slides from the inner surface 100. The increase in the force applied by the water to the shuttle acts to move the shuttle quickly to the downstream-most position.

The invention may also be embodied as a flow control device that does not regulate the pressure of liquid, such as water, flowing through the device. The structure of such as device may be the same as shown in FIGS. 1 to 6, except that the plunger need not move with respect to the housing. For example, the plunger may be fixed in position in the housing, e.g., inlet cap and outlet cap, by the liner 22 and outlet cap 14. If the plunger is fixed to the housing, the plunger is not capable of moving axially towards the valve seat and thereby regulate a pressure drop through the (G) between the inlet of the plunger 50 and the valve seat 52. If the plunger is fixed, it may be a fixed flow conduit within the housing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure regulator including:
   a housing including a flow passage;
   a plunger configured to move within the housing, wherein the plunger is hollow and has a plunger passage included in the flow passage;
   a valve seat in the housing and disposed in the flow passage immediately upstream of an inlet to the plunger passage, and the valve seat is aligned with the inlet to the plunger passage along an axis of the plunger passage;
   a gap between the valve seat and the inlet to the plunger passage, wherein the gap is a narrowest region of the flow passage;
   a shuttle within the housing configured to move between: (i) an upstream position at which the shuttle is adjacent the valve seat to close the gap in the flow passage and prevents liquid flowing into the inlet of the plunger passage, and (ii) a downstream position displaced from the valve seat which opens the gap in the flow passage and allows liquid to flow into the inlet of the plunger passage;
   a sealed chamber within the housing, and adjacent to the plunger and the shuttle, wherein the sealed chamber is configured to be operated at pressures other than at atmospheric pressure; and
   a port in the housing and open to the sealed chamber, wherein the port is configured to be connected to a source of a pressurized fluid.

2. The pressure regulator of claim 1, further comprising a spring in the sealed chamber, wherein one end of the spring presses against the shuttle and an opposite end of the spring presses against a flange of the plunger.

3. The pressure regulator of claim 1 wherein the source of the pressurized fluid is a source of a pressurized gas.

4. The pressure regulator of claim 1, further comprising a valve connected to the port, wherein the valve has a first position at which a pressurized fluid from the source of the pressurized fluid flows into the sealed chamber and a second position in which the pressurized fluid flows out of the sealed chamber to release pressure in the chamber.

5. The pressure regulator of claim 1, further comprising a controller configured to pressurize the sealed chamber according to a pressurization cycle.

6. The pressure regulator of claim 1, wherein the shuttle includes:
   a first inner cylindrical surface having a first seal configured to slidingly engage the plunger, and
   a second inner cylindrical surface having a second seal configured to engage the valve seat,
   wherein a diameter of the second inner cylindrical surface is greater than a diameter of the first inner cylindrical surface.

7. The pressure regulator of claim 6, wherein the first inner cylindrical surface includes a first annular groove and the first seal is an O ring seated in the first annular groove, and the second cylindrical surface includes a second annular groove and the second seal is an O ring seated in the second annular groove.

8. The pressure regulator of claim 1, wherein the shuttle is annular and includes:
   a first outer cylindrical surface having a third seal configured to slidingly engage a first inner cylindrical surface of the housing, and
   a second outer cylindrical surface having a fourth seal configured to engage a second inner cylindrical surface of the housing while the shuttle is in the upstream most position,
   wherein a diameter of the first outer cylindrical surface of the shuttle is greater than a diameter of the second outer cylindrical surface of the shuttle.

9. The pressure regulator of claim 8, wherein the first outer cylindrical surface of the shuttle includes a third annular groove, and the third seal is an O ring seated in the third annular groove, and the second outer cylindrical surface includes a fourth annular groove and the fourth seal is an O ring seated in the fourth annular groove.

10. A flow control device including:
    a housing including a flow passage extending from an inlet of the housing, through the housing to an outlet of the housing;
    a hollow conduit which defines a conduit passage included in the flow passage of the housing;
    a valve seat in the housing and disposed in the flow passage immediately upstream of an inlet to the conduit passage, and the valve seat is aligned with the inlet to the conduit passage along an axis of the conduit passage;
    a gap between the valve seat and the inlet to the conduit passage, wherein the gap is a narrowest region of the flow passage;
    a shuttle within the housing and configured to move reciprocally with respect to both the housing and the hollow conduit, wherein the shuttle has: (i) an upstream position within the housing at which the shuttle is adjacent the valve seat and closes the gap in the flow passage and prevents liquid flowing into the inlet to the conduit passage, and (ii) a downstream position displaced from the valve seat and which opens the gap in the flow passage and thereby allows liquid to flow into the inlet to the conduit passage;
    a sealed chamber within the housing, and adjacent the hollow conduit and the shuttle, wherein the sealed chamber is configured to be operated at pressures other than atmospheric pressure; and
    a port in the housing and open to the sealed chamber, wherein the port is configured to be connected to a source of a pressurized fluid.

11. The flow control device of claim 10, further comprising a spring in the sealed chamber, wherein one end of the spring presses against the shuttle and an opposite end of the spring presses against a flange of the hollow conduit.

12. The flow control device of claim 10, further comprising a valve connected to the port, wherein the valve has a first position at which a pressurized fluid from the source of the pressurized fluid flows into the sealed chamber and a second position in which the pressurized fluid flows out of the sealed chamber to release pressure in the sealed chamber.

13. The flow control device of claim 10, further comprising a controller configured to pressurize the sealed chamber according to a pressurization cycle.

14. The flow control device of claim 10, wherein the shuttle includes:
    a first outer cylindrical surface having a third seal configured to slidingly engage a first inner cylindrical surface of the housing, and a second outer cylindrical surface having a fourth seal configured to engage a second inner cylindrical surface of the housing while the shuttle is in the upstream most position, wherein a diameter of the first outer cylindrical surface of the shuttle is greater than a diameter of the second outer cylindrical surface of the shuttle.

15. The flow control device of claim 14, wherein the first outer cylindrical surface of the shuttle includes a third annular groove, and the third seal is an O ring seated in the third annular groove, and the second outer cylindrical surface includes a fourth annular groove and the fourth seal is an O ring seated in the fourth annular groove.

16. A method to control a flow control device including a housing having a flow passage extending through the housing from an inlet to an outlet, wherein the flow passage is partially defined by a hollow conduit within the housing, a shuttle, and a sealed chamber between the hollow conduit and the housing, wherein the method comprises:

moving the shuttle within the housing to close a gap between a valve seat in the housing and an inlet to the hollow conduit, wherein the movement of the shuttle is driven by injecting a pressurized fluid into the sealed chamber and wherein closing the gap prevents liquid flowing into the inlet to the hollow conduit; and moving the shuttle away from the valve seat to thereby open the gap and allow liquid to flow into the inlet of the hollow conduit and through to the outlet of the housing, wherein the movement of the shuttle is driven by releasing the pressurized fluid from the sealed chamber to reduce pressure in the sealed chamber.

17. The method according to claim 16, wherein the injection of the pressurized fluid into the sealed chamber and the movements of the shuttle are performed in accordance with a schedule.

18. The method of claim 17, wherein the schedule includes a repeating cycle having a period during which the shuttle is against the valve seat and the flow passage is closed, and another period during which the shuttle is away from the valve seat and the flow passage is open.

19. The method of claim 16, further comprising moving the shuttle to seal against the valve seat to close the gap in the flow passage in response to water pressure at an inlet to the flow passage being below a threshold water pressure.

20. The method of claim 16, wherein the movement of the shuttle is driven by a spring pushing the shuttle towards the valve seat, and a liquid in the housing and upstream of the valve seat applies a pressure pushing the shuttle away from the valve seat.

21. The method of claim 16, further comprising:

applying liquid pressure at the outlet of the housing to the hollow conduit to push the hollow conduit towards the valve seat;

moving the inlet of the hollow conduit towards and away from the valve seat due to the liquid pressure at the outlet of the housing acting on the hollow conduit and due to a spring biasing force pushing the hollow conduit away from the valve seat, and regulating the liquid pressure at the outlet of the housing by adjusting the gap between the inlet of the hollow conduit and the valve seat, wherein the gap is adjusted as the hollow conduit is moved towards and away from the valve seat due to the liquid pressure at the outlet and the spring biasing force.

* * * * *